(12) United States Patent
Winiarski et al.

(10) Patent No.: US 11,141,916 B2
(45) Date of Patent: Oct. 12, 2021

(54) APPARATUS FOR ADDITIVELY MANUFACTURING OF THREE-DIMENSIONAL OBJECTS

(71) Applicant: CL SCHUTZRECHTSVERWALTUNGS GMBH, Lichtenfels (DE)

(72) Inventors: Daniel Winiarski, Bad Staffelstein (DE); Jens Stammberger, Rödental (DE); Alexander Hofmann, Weismain (DE)

(73) Assignee: Concept Laser GmbH, Lichtenfels (DE)

( * ) Notice: Subject to any disclaimer, the term of this patent is extended or adjusted under 35 U.S.C. 154(b) by 0 days.

(21) Appl. No.: 15/981,571

(22) Filed: May 16, 2018

(65) Prior Publication Data

US 2019/0022938 A1   Jan. 24, 2019

(30) Foreign Application Priority Data

Jul. 21, 2017   (EP) .................................... 17182641

(51) Int. Cl.
```
B29C 64/25      (2017.01)
B29C 64/259     (2017.01)
B33Y 30/00      (2015.01)
B23K 26/354     (2014.01)
B23K 26/34      (2014.01)
```
(Continued)

(52) U.S. Cl.
CPC .............. *B29C 64/25* (2017.08); *B22F 12/00* (2021.01); *B23K 26/34* (2013.01); *B23K 26/354* (2015.10); *B28B 1/001* (2013.01); *B29C 64/259* (2017.08); *B33Y 30/00* (2014.12); *B22F 10/10* (2021.01)

(58) Field of Classification Search
CPC ........ B33Y 30/00; B29C 64/25; B29C 64/259
See application file for complete search history.

(56) References Cited

U.S. PATENT DOCUMENTS 6,554,600 B1 *  4/2003  Hofmann ................ B29C 41/34
                                            425/174.4
7,357,629 B2    4/2008  Weiskopf et al.
(Continued)

FOREIGN PATENT DOCUMENTS

CN    104503549 A    4/2015
CN    206049679 U    3/2017
(Continued)

OTHER PUBLICATIONS

European Search Report Corresponding to Application No. 17182641 dated Jan. 9, 2018.
(Continued)

*Primary Examiner* — George R Koch
*Assistant Examiner* — Jimmy R Smith, Jr.
(74) *Attorney, Agent, or Firm* — Dority & Manning, P.A.

(57) ABSTRACT

Apparatus (1) for additively manufacturing of three-dimensional objects by means of successive layerwise selective irradiation and consolidation of layers of a build material which can be consolidated by means of an energy beam, comprising at least one process chamber (2), wherein the process chamber (2) comprises at least two chamber segments (3, 4), wherein at least one chamber segment (3, 4) is mounted on the at least one other chamber segment (3, 4) and is separately detachable.

13 Claims, 2 Drawing Sheets

Figure 1:
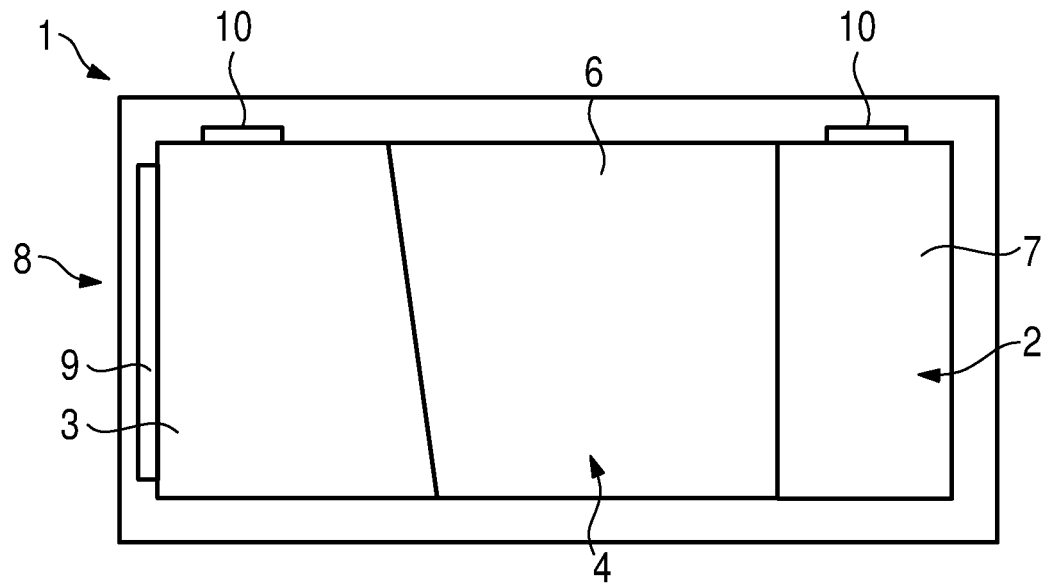

(51) Int. Cl.
    *B28B 1/00*       (2006.01)
    *B22F 12/00*     (2021.01)
    *B22F 10/10*     (2021.01)

(56) References Cited

U.S. PATENT DOCUMENTS

| | | | |
|---|---|---|---|
| 10,182,892 B2 | 1/2019 | Korten et al. | |
| 2011/0089610 A1 | 4/2011 | El-Siblani et al. | |
| 2013/0000553 A1* | 1/2013 | Hoechsmann | B29C 64/35 |
| | | | 118/708 |
| 2016/0339640 A1* | 11/2016 | Juan | B29C 67/0085 |
| 2020/0031043 A1* | 1/2020 | Krol | B28B 1/001 |

FOREIGN PATENT DOCUMENTS

| | | |
|---|---|---|
| DE | 102009036153 A1 | 2/2011 |
| EP | 1704989 A2 | 9/2006 |
| JP | 2005/319317 A | 11/2005 |
| JP | 2015/519142 A | 7/2015 |
| WO | WO2013/181262 A1 | 12/2013 |
| WO | 2014165735 A1 | 10/2014 |
| WO | 2016085334 A2 | 6/2016 |

OTHER PUBLICATIONS

Machine Translated Japanese Office Action Corresponding to Application No. 2017230367 dated Sep. 26, 2018.
Combined Chinese Office Action and Search Report Corresponding to Application No. 201711020006 dated May 19, 2020.

\* cited by examiner

APPARATUS FOR ADDITIVELY MANUFACTURING OF THREE-DIMENSIONAL OBJECTS

CROSS-REFERENCE TO RELATED APPLICATIONS

This application claims priority to European Patent Application serial no. 17 182 641.5 filed Jul. 21, 2017, the contents of which are incorporated herein by reference in their entirety as if set forth verbatim.

DESCRIPTION

The invention relates to an apparatus for additively manufacturing of three-dimensional objects by means of successive layerwise selective irradiation and consolidation of layers of the build material which can be consolidated by means of an energy beam, comprising at least one process chamber.

Such apparatuses for additively manufacturing of three-dimensional objects are known from prior art, wherein the apparatus comprises a process chamber in which the manufacturing process takes place. Further, efforts have been made to fully automise the manufacturing process and to maximize the volume of the build chamber. Additionally, the space required by the apparatus should be minimized, whereby working spaces for an execution of service tasks on or cleaning of the apparatus, for example the process chamber, have to be provided.

The endeavour for maximizing the volume of the build chamber and the simultaneous strive for reducing the overall dimensions of the apparatus disadvantageously lead to process chambers in which the space requirements for service tasks, such as repairing or cleaning parts of the apparatus, in particular parts within the process chamber, are not sufficiently met. Therefore, based on the maximizing of the build chamber and the growth of single components inside the process chamber the accessibility of various parts inside the process chamber suffers.

It is therefore, an object of the present invention to provide an apparatus, wherein the accessibility is improved.

The object is inventively achieved by an apparatus according to the claims.

The apparatus described herein is an apparatus for additively manufacturing three-dimensional objects, e.g. technical components, by means of successive layerwise selective irradiation and consolidation of layers of a powdered build material ("build material") which can be consolidated by means of an energy beam. A respective build material can be a metal, ceramic or polymer powder. A respective energy beam can be a laser beam or an electronic beam. A respective apparatus can be a selective laser sintering apparatus, a selective laser melting apparatus or a selective electron beam melting apparatus, for instance.

The apparatus comprises a number of functional units which are used during its operation. Exemplary functional units are a process chamber, an irradiation device which is configured to selectively irradiate a build material layer disposed in the process chamber with at least one energy beam, and a stream generating device which is configured to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

The invention is based on the idea that the process chamber comprises at least two chamber segments, wherein at least one chamber segment is mounted on the at least one other chamber segment and is separately detachable. Therefore, the apparatus is separated in several segments that are separable from one another. Thus, the accessibility of components inside the process chamber is improved, since a specific segment can be separated and unmounted providing access to a specific area or region inside the process chamber that is delimited by the specific segment.

By way of the invention it is possible to execute service tasks with increased accessibility by separating the required segments or the segments delimiting the process chamber in the area the service task has to be executed in. Hence, sufficient space or accessibility, respectively, is assured while the overall space requirement of the apparatus with all segments attached can be reduced. If service personnel need to access a specific area of the process chamber the corresponding segment can be unmounted so that full access is provided. Another advantage of the inventive apparatus is that the apparatus does not need to provide an opening or the like for personnel to access the process chamber, but specific walls and/or segments delimiting the process chamber can simply be detached to provide access to the process chamber.

It is particularly preferred that at least one chamber segment is separable into at least two sub-segments. Consequently, the respective segment can be divided into at least two sub-segments, wherein at least one of the sub-segments can be unmounted providing access to the process chamber. For example one sub-segment can be built as a cover, wherein after removing the cover a passageway to access the process chamber is opened.

Preferably, the chamber segment is at least part of a wall and/or a base plate and/or a cover delimiting the process chamber. The inventive apparatus can therefore, be segmented in an arbitrary direction and every segment can be divided into a plurality of sub-segments, wherein every segment and/or sub-segment is relatively movable with respect to the other segments. This provides a modular structure of the apparatus, wherein every area of the apparatus can be made accessible by having correspondent segments or the respective delimiting component of the process chamber separable into at least two sub-segments. It is therefore possible to have a part of the base plate and/or a wall and/or a cover building one segment that is separable into sub-segments, for example a part of the base plate and a part of a wall build one segment that is separable along a plane perpendicular to a coating direction.

Further, the inventive apparatus can be improved in that at least one connection and/or at least one interface assigned to at least one separately detachable chamber segment is detachable from the chamber segment. Consequently, if the separately detachable chamber segment is detached from another chamber segment a connection and/or an interface assigned and connected to the detachable chamber segment can be detached to allow for a demounting of the chamber segment and therefore, providing access to the process chamber.

According to another embodiment of the inventive apparatus, at least one chamber segment comprises a port and/or a seal and/or a lock and/or a lead-in chamfer. According to this embodiment at least one chamber segment comprises a component to enable or simplify the assembly of at least one connection that is detachably mounted or mountable on the chamber segment.

According to a preferred embodiment of the inventive apparatus at least one chamber segment is extractably mounted on the at least one other chamber segment. According to this embodiment it is possible to extract one chamber segment relative to another chamber segment, whereby the first chamber segment is still attached to or held by the other chamber segment, whereby the extractable mount allows for a movement of the two chamber segments relative to one another. Therefore, heavy parts of the apparatus can be held by the extractable mount and can still be removed from the process chamber to create access to the process chamber. Service personnel can therefore, pull out the respective chamber segment, for example like a drawer, in particular after releasing a lock or the like assuring a connection between the chamber segments, to gain access to an area of the process chamber delimited by the chamber segment.

The inventive apparatus can further be improved by at least one demounting unit configured to support the at least one chamber segment in a detached state. The demounting unit allows for removing the chamber segment from the structure of the apparatus, while still supporting the chamber segment. In particular for heavy or large-scale segments of the apparatus it is necessary to support the segment and/or to stow the segment after detachment. For example if service personnel detaches such a segment the demounting unit can be used to support the detached chamber segment so that service personnel does not have to carry and/or handle the segment. Additionally, a safe handling can be assured.

The previously described embodiment of the inventive apparatus can further be improved in that the demounting unit comprises at least one rail mounted on at least one chamber segment, wherein the chamber segment is movable along the rail in the detached state. This embodiment allows for an extractable movement of the chamber segment, wherein the demounting unit comprises a rail along which the chamber segment can be extractably moved. The chamber segment is coupled with the demounting unit working like an extractable drawer and can be pulled out of the structure of the apparatus. The chamber segment can therefore, be detached and pulled out or extractably drawn out, wherein the demounting unit, in particular the rail of the demounting unit, holds and supports the chamber segment assuring the chamber segment is safely stowed in a space-saving manner.

An apparatus according to a specific embodiment can provide three chamber segments, wherein a first chamber segment is detachable from a first segment of a base plate and/or a second and/or third segment and the second chamber segment is detachable from a second segment of the base plate or the first and/or third chamber segment and is movable along at least one rail of a demounting unit and the third segment is undetachably fixed. The first chamber segment can therefore, be connected to a base plate and/or the second and/or third segment of the process chamber. To gain access to the area of the process chamber delimited by a specific chamber segment the chamber segment can be detached.

The second chamber segment is connected to the demounting unit and therefore, detachable from a base plate or the neighbouring chamber segments to extractably move the second chamber segment to gain access to the respective area of the process chamber. Further, a third segment can be provided by the apparatus according to this embodiment, wherein the third segment is undetachable and fixed to a respective segment of the process chamber. It is also possible to have the demounting unit mounted on the third segment, wherein the demounting unit comprises a rail along which the second chamber segment is movable relative to the third chamber segment.

Self-evidently, each chamber segment provides a seal to ensure that the process chamber is sealed gas-tight. The seal allows for an attachment and detachment of the specific chamber segments with one another assuring a gas-tight seal in an attached state.

Besides, the invention relates to a plant with at least two inventive apparatuses, wherein at least one chamber segment is interchangeable between the two apparatuses. By way of the inventive plant it is possible, to interchange several segments of the apparatuses to modify the specific apparatuses. Hence, each apparatus can be modified modularly by changing specific chamber segments. Each chamber segment can be equipped with at least one component, for example a camera, whereby the choice whether a chamber segment is mounted on the apparatus can be made according to the availability of components on the chamber segments. Thus, a defined set of chamber segments can be provided for the plant, whereby service personnel can choose which chamber segment should be mounted on a specific apparatus according to the intended use of the apparatus. The interchangeability of the chamber segments allows for changing the size of the process chamber as larger or smaller chamber segments can be induced into the structure of the apparatus. Additionally, the chamber segments with certain properties, such as openings or doors can be mounted to a specific apparatus if need be.

Figure 2:
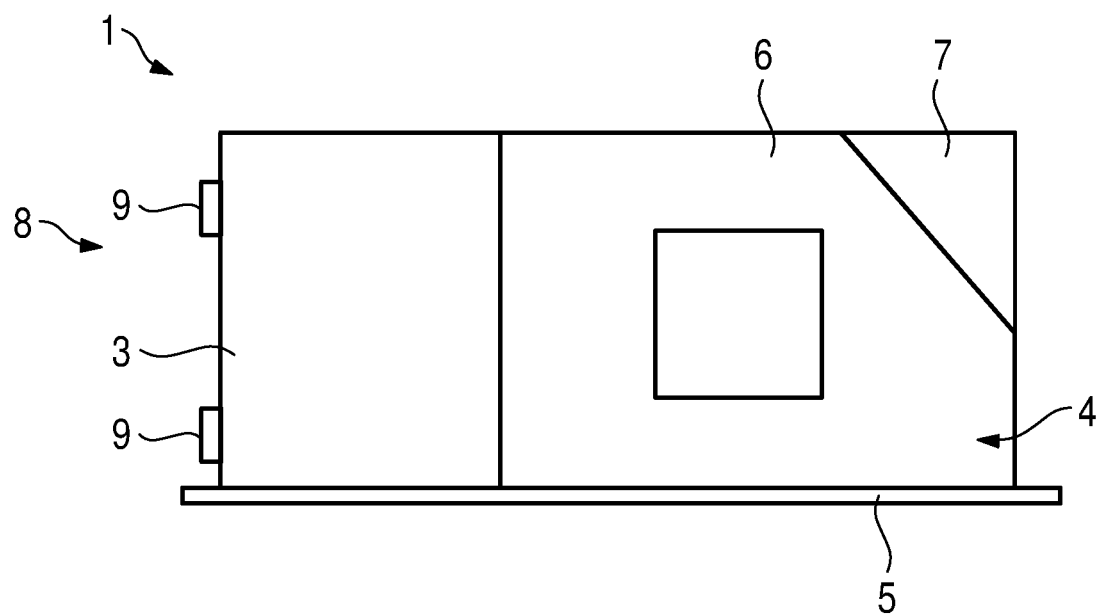

Exemplary embodiments of the invention are described with reference to the figs. The figs. are schematic views and show:

FIG. 1 an inventive apparatus in top view;

FIG. 2 the inventive apparatus of FIG. 1 in front view; and

Figure 3:
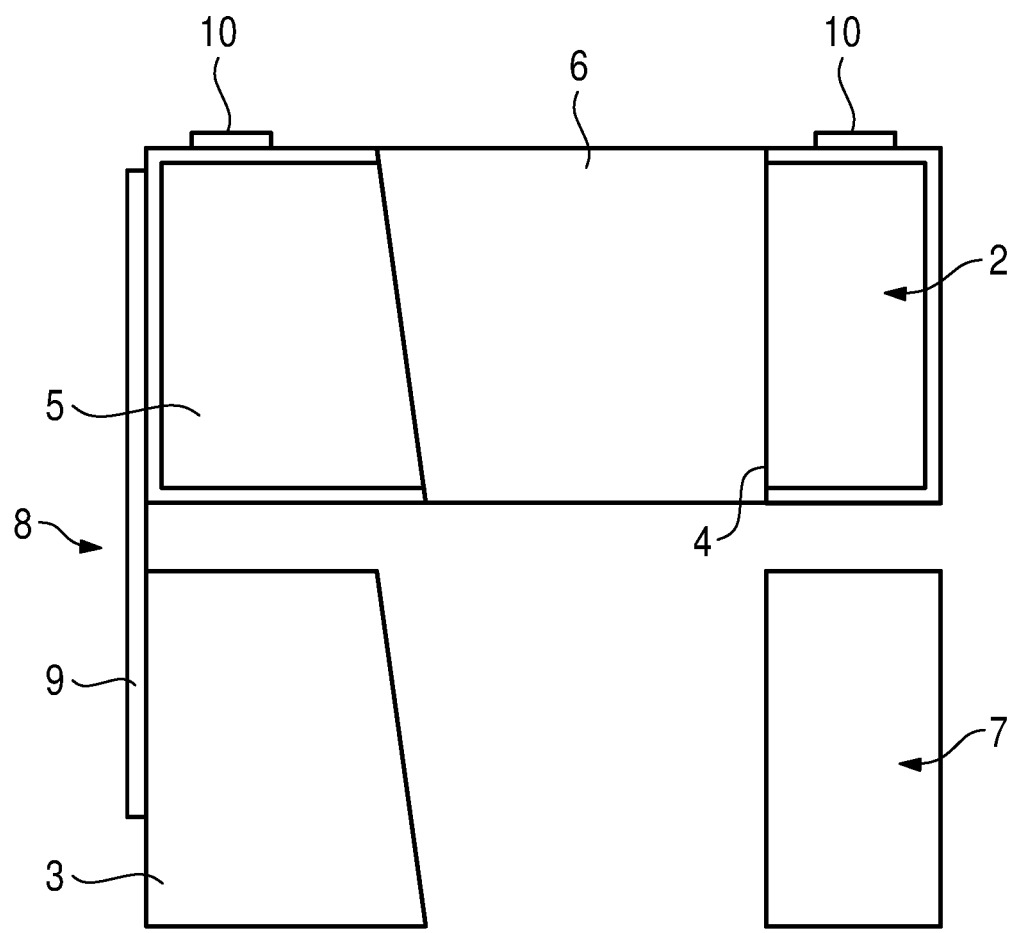

FIG. 3 the inventive apparatus of FIG. 1 in a detached state in front view.

FIG. 1 shows an apparatus 1 for additively manufacturing of three-dimensional objects by means of successive layer-wise selective irradiation and consolidation of layers of a build material which can be consolidated by means of an energy beam, comprising a process chamber 2. The process chamber 2 comprises two chamber segments 3, 4, wherein the chamber segment 3 is mounted on the chamber segment 4 and is separately detachable.

As can be seen from FIG. 2 the apparatus 1 further comprises a base plate 5 on which the chamber segments 3, 4 rest. According to this embodiment the chamber segment 4 is undetachably fixed to the base plate 5. The chamber segment 4 is separable into two sub-segments 6, 7, wherein the sub-segment 6 is undetachably fixed to a base plate 5 and the sub-segment 7 is detachable from the sub-segment 6. The sub-segment 7 is build similar to a cover and therefore, can be lifted off the sub-segment 6 after detachment. Therefore, access is available to the corresponding area of the process chamber 2 delimited by the sub-segment 7. A detached state of the sub-segment 7 is depicted in FIG. 3 as a top view.

The figures further show that the apparatus 1 comprises a demounting unit 8 comprising two rails 9 horizontally attached to a sidewall 10 of the process chamber 2. The chamber segment 3 is extractably mounted via the demounting unit 8 and therefore movable along the rail 9. After detaching the chamber segment 3 the chamber segment 3 can be moved along the rail 9 to provide access to the process chamber 2.

Further, the apparatus 1 comprises two connections 10 connected to the chamber segment 3 and the chamber sub-segment 7, whereby the connections 10 are detachably connected. As the chamber segment 3 and the sub-segment 7 are detached the connections 10 can be detached from the respective chamber segment 3 or sub-segment 7. The unmounted segment 3 or sub-segment 7 can be interchanged to another apparatus (not shown).

The invention claimed is:

1. An apparatus for additively manufacturing three-dimensional objects, the apparatus comprising:
   a process chamber comprising a first chamber segment and a second chamber segment each delimiting the process chamber, the first chamber segment and the second chamber segment being attached to one another in an attached state, and being movable relative to one another in a detached state and thereby providing access to the process chamber;
   a demounting unit, the demounting unit configured to support at least one of the first chamber segment or the second chamber segment in the detached state, at least one of the first chamber segment or the second chamber segment being mounted to the demounting unit and extractable relative to the other of the first and second chamber segments; and
   a base plate, the base plate configured to support the first chamber segment and the second chamber segment at least in the attached state;
   wherein the first chamber segment comprises a first sub-segment and a second sub-segment, the first sub-segment and the second sub-segment being movable relative to one another so as to provide access to the process chamber and wherein the first sub-segment is undetachably fixed to the base plate, and the second sub-segment is movable relative to the first sub-segment.

2. The apparatus of claim 1, wherein the demounting unit comprises at least one rail mounted on at least one of the first chamber segment or the second chamber segment, at least one of the first chamber segment or the second chamber segment being movable along the at least one rail when moving from the attached state to the detached state.

3. The apparatus of claim 2, further comprising a sidewall, wherein the at least one rail is mounted to the sidewall.

4. The apparatus of claim 3, wherein the at least one rail comprises a first rail and a second rail, the first rail and the second rail being mounted to the sidewall.

5. The apparatus of claim 1, wherein the first chamber segment is undetachably fixed to the base plate and the second chamber segment is detachable from the base plate.

6. The apparatus of claim 1, wherein the first chamber segment is mounted on the second chamber segment and is extractable relative to the second chamber segment.

7. The apparatus of claim 1, further comprising a third chamber segment, the third chamber segment and the second chamber segment being attached to one another in the attached state and being movable relative to one another and thereby providing access to the process chamber in the detached state.

8. The apparatus of claim 7, wherein the third chamber segment comprises an undetachably fixed portion of the process chamber.

9. The apparatus of claim 1, wherein the first chamber segment and the second chamber segment each comprise at least part of a wall segment, at least part of a base plate segment, and/or at least part of a cover segment, each delimiting a respective portion of the process chamber.

10. The apparatus of claim 1, wherein at least one of the first chamber segment or the second chamber segment comprises a port, a seal, a lock, and/or a lead-in chamfer.

11. A method of servicing the apparatus according to claim 1, the method comprising:
    moving the first chamber segment and the second chamber segment relative to one another from the attached state to the detached state, the first chamber segment and the second chamber segment being attached to one another in the attached state and providing access to the process chamber in the detached state; and
    supporting at least one of the first chamber segment or the second chamber segment at least in part with the demounting unit in the detached state, wherein at least one of the first chamber segment or the second chamber segment is extractably mounted to the demounting unit;
    supporting with the base plate, the first chamber segment and the second chamber segment at least in the attached state; and
    moving the first sub-segment and the second sub-segment of the first chamber segment relative to one another so as to provide access to the process chamber, wherein the first sub-segment is undetachably fixed to the base plate, and the second sub-segment is movable relative to the first sub-segment.

12. The method of claim 11, further comprising:
    executing a service task on one or more components within the process chamber.

13. The method of claim 11, further comprising:
    interchanging at least one of the first chamber segment or the second chamber segment for at least one other chamber segment.

* * * * *